United States Patent
Kimura (10) Patent No.: US 9,686,394 B2
(45) Date of Patent: Jun. 20, 2017

(54) PORTABLE TERMINAL DEVICE

(71) Applicant: Sharp Kabushiki Kaisha, Sakai-shi, Osaka (JP)

(72) Inventor: Osamu Kimura, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/118,626

(22) PCT Filed: Jan. 8, 2015

(86) PCT No.: PCT/JP2015/050325
§ 371 (c)(1),
(2) Date: Aug. 12, 2016

(87) PCT Pub. No.: WO2015/129294
PCT Pub. Date: Sep. 3, 2015

(65) Prior Publication Data
US 2017/0064064 A1    Mar. 2, 2017

(30) Foreign Application Priority Data
Feb. 25, 2014 (JP) .............................. 2014-034445

(51) Int. Cl.
*H04W 4/12* (2009.01)
*H04M 1/725* (2006.01)
(Continued)

(52) U.S. Cl.
CPC ......... *H04M 1/72519* (2013.01); *H04W 4/12* (2013.01); *H04W 12/02* (2013.01); *H04M 1/571* (2013.01)

(58) Field of Classification Search
CPC .......... H04M 1/72; H04W 4/12; H04W 12/02
(Continued)

(56) References Cited

U.S. PATENT DOCUMENTS 6,035,191 A * 3/2000 Moore .............. H04M 1/72563
                                                                455/418
9,125,144 B1 * 9/2015 Orbach ................. H04M 19/04
(Continued)

FOREIGN PATENT DOCUMENTS

| JP | 2001-268221 A | 9/2001 |
| JP | 2007-228616 A | 9/2007 |

(Continued)

OTHER PUBLICATIONS

Official Communication issued in International Patent Application No. PCT/JP2015/050325, mailed on Mar. 24, 2015.

*Primary Examiner* — Cong Tran
(74) *Attorney, Agent, or Firm* — Keating & Bennett, LLP (57) ABSTRACT

A mobile device that makes it possible to prevent a person other than a user from being aware of information relating to a predetermined communication while also enabling the user to immediately be aware of the information relating to the predetermined communication. The mobile device includes a status determining section (41) for determining, in a case where a communication is received, whether or not the mobile device is being left unattended; and an output control section (42) for outputting predetermined received communication information in a case where the mobile device is not being left unattended, the output control section (42) skipping output of the predetermined received communication information in a case where the mobile device is being left unattended.

7 Claims, 4 Drawing Sheets

(51) Int. Cl.
*H04W 12/02* (2009.01)
*H04M 1/57* (2006.01)

(58) Field of Classification Search
USPC .................. 455/410, 411, 418, 414.1, 456.1
See application file for complete search history.

(56) References Cited

U.S. PATENT DOCUMENTS

| | | | |
|---|---|---|---|
| 2004/0208141 A1* | 10/2004 | Nakao | H04M 1/72547 370/328 |
| 2007/0071180 A1* | 3/2007 | Kanada | G06F 21/316 379/39 |
| 2009/0124296 A1 | 5/2009 | Tanae | |
| 2013/0102281 A1* | 4/2013 | Kanda | G06F 21/36 455/410 |
| 2013/0189963 A1* | 7/2013 | Epp | H04M 1/64 455/414.1 |
| 2013/0237241 A1* | 9/2013 | Burke | G01P 13/00 455/456.1 |

FOREIGN PATENT DOCUMENTS

| | | |
|---|---|---|
| JP | 2011-217149 A | 10/2011 |
| JP | 2013-93699 A | 5/2013 |
| JP | 2013-207733 A | 10/2013 |
| JP | 2014-27596 A | 2/2014 |

\* cited by examiner

PORTABLE TERMINAL DEVICE

TECHNICAL FIELD

The present invention relates to (i) a mobile device capable of receiving a communication and (ii) a control program for controlling displaying of information relating to a communication.

BACKGROUND ART

In widely used conventional techniques, a user is notified of having received a specific type of communication such as a phone call or an email, in a case where a mobile device, such as a mobile phone or smartphone, receives it. For example, Patent Literature 1 proposes a mobile phone that displays notification information regarding a new email arrival in a notification region of a lock screen.

CITATION LIST

Patent Literature

[Patent Literature 1]
Japanese Patent Application Publication Tokukai No. 2013-93699 (Publication date: May 16, 2013)
[Patent Literature 2]
Japanese Patent Application Publication Tokukai No. 2011-217149 (Publication date: Oct. 27, 2011)

SUMMARY OF INVENTION

Technical Problem

Unfortunately, conventional art such as that mentioned above exhibits, for example a problem that in a case where a communication is received by a mobile device being used, a person other than the user of the device may be made aware of information relating to that communication. For example, the mobile phone of Patent Literature 1 displays notification information relating to a newly received email even in a case where the mobile phone is locked. Due to this, the notification information on the newly received email arrival may be seen by a person other than the user. Meanwhile, in a case of a mobile phone that, regardless of whether being left unattended or not, simply does not display information relating to a received communication, the user cannot immediately be aware of information relating to the received communication. The present invention was made in view of the above problems. The present invention makes it possible, for example, to prevent a person other than the user of a device from being aware of information relating to a predetermined communication while also allowing the user to immediately be aware of the information.

Solution to Problem

In order to solve the above problems, a mobile device according to one aspect of the present invention is a mobile device including: a status determining section for determining, in a case where a communication is received, whether or not the mobile device is being left unattended; and an output control section for outputting predetermined received communication information relating to a received communication in a case where the status determining section has determined that the mobile device is not being left unattended, the output control section skipping output of the predetermined received communication information in a case where the status determining section has determined that the mobile device is being left unattended.

Advantageous Effects of Invention

One aspect of the present invention brings about the advantageous effect of making it possible to prevent a person other than the user of a device from being aware of information relating to a predetermined communication, while also allowing the user to immediately be aware of the information.

DESCRIPTION OF EMBODIMENTS

Embodiment 1

Figure 1:
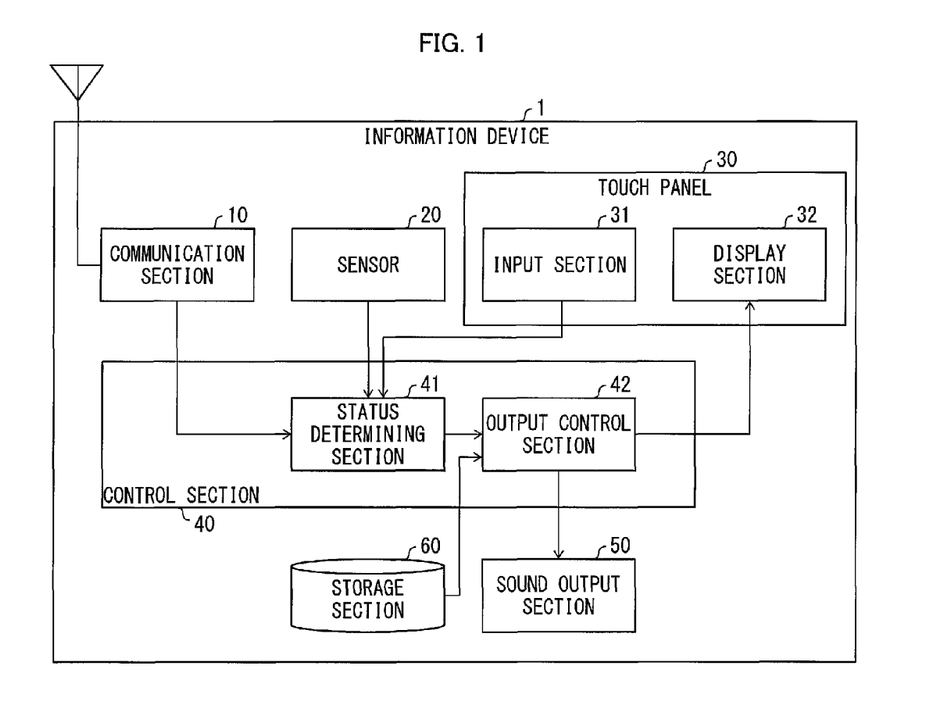
FIG. 1 is a functional block diagram illustrating a configuration of an information device in accordance with Embodiment 1 of the present invention.
Figure 2:
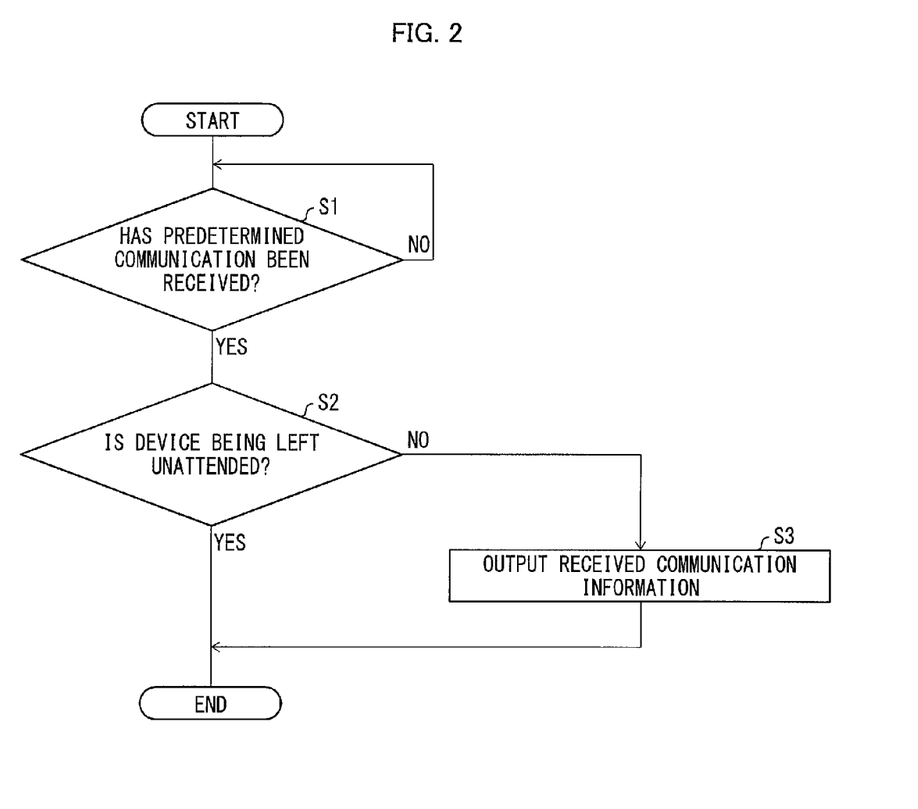
FIG. 2 is a flowchart showing processing in Embodiment of the present invention which processing relates to receiving a communication.

The following is a discussion of a first embodiment (Embodiment 1) of the present invention with reference to FIGS. 1 and 2.

[1. Overview of Information Device 1]

First, a configuration of an information device 1 (mobile device) will be discussed with reference to FIG. 1. FIG. 1 is a functional block diagram illustrating a configuration of the information device 1. As illustrated in FIG. 1, the information device 1 includes a communication section 10, a sensor 20, a touch panel 30, a control section 40, a sound output section 50, and a storage section 60.

The communication section 10 receives a predetermined communication, such as a phone call or email, and supplies, to a status determining section 41, information contained in the communication thus received (this information is hereinafter referred to as "basic information"). Note that the communication section 10 can be configured so as to perform wireless and/or wired communication. Note that the basic information differs in accordance with a type of received communication. The basic information includes the telephone number of a caller, in a case where, for example, a phone call is received. Similarly, the basic information includes the email address of a sender, in a case where, for example, an email is received. In a case where the basic information includes a phone number, the communication section 10 determines that the received communication is a phone call. Likewise, in a case where the basic information includes an email address, the communication section 10 determines that the received communication is an email.

The sensor 20 is realized by, for example, (i) a grip sensor for detecting the information device 1 being held or (ii) an accelerometer for detecting an acceleration of the information device 1. The sensor 20 supplies, to the status determination section 41, a signal indicating detected information.

As illustrated in FIG. 1, the touch panel 30 includes an input section 31 and a display section 32. The input section 31 is provided such that it overlies a display screen of the display section 32. The input section 31 converts, into a signal, a touch at the touch panel 30 via a finger, stylus, or the like. The input section 31 then supplies a converted signal to the control section 40. Such a touch is converted by a method, for example, an electrostatic induction method, a resistance film method, or an optical method. Note, here, that the "touch" refers to an operation involving contact with and/or proximity to a specific subject. The display section 32 displays a display image on the display screen upon receipt, from the control section 40, of information on the display image. The display section 32 includes (i) a display device such as a liquid crystal display (LCD) or electroluminescence (EL) display and (ii) a driving circuit for driving the display device in accordance with received image data. Note that (a) the input section 31 and the display section 32 can be independent from each other and (b) a mouse or keyboard, for example, can be employed as the input section 31.

The sound output section 50 outputs sound in accordance with a signal received from the control section 40. The sound output section 50 can be realized by, for example, a flat panel speaker that causes a surface of the information device 1 to vibrate. The sound output section 50 can include an amplifying circuit and/or a digital/analog (D/A) converter, etc.

The storage section 60 stores a database in which (i) information that can be included in the basic information is associated with (ii) additional information. Examples of information that can be included in the basic information encompass a telephone number and an email address. Note also that "additional information" refers to information associated with the basic information. Examples of the additional information include (i) a name, (ii) an email address, (iii) a group to which a contact belongs, (iv) images such as a facial and/or full-body photograph(s), (v) a nickname, (vi) a ringtone, (vii) a vibration pattern used for incoming communication notification, and (viii) a blinking pattern. Note that the additional information is registered beforehand on the storage section 60. The storage section 60 is realized by a storage medium such as read only memory (ROM), random access memory (RAM), a hard disk drive (HDD), or flash memory.

As illustrated in FIG. 1, the control section 40 includes a status determining section 41 (status determining section) and an output control section 42 (output control section). When the communication section 10 has outputted basic information, the status determining section 41 determines, whether or not the information device 1 is being left unattended, based on, for example, a signal outputted by the sensor 20. The status determining section 41 then outputs, to the output control section 42, a determined result along with the basic information.

In Embodiment 1, the status determining section 41 determines whether the information device 1 is being left unattended, based on whether or not the signal outputted by the sensor 20 indicates that the information device 1 is being held. That is, the status determining section 41 is configured to (i) determine that the information device 1 is not being left unattended in a case where the information device 1 is being held and (ii) determine that the information device 1 is being left unattended in a case where the information device is not being held.

The output control section 42 generates information composed of the basic information and the additional information associated therewith (information generated thusly is hereinafter referred to as "received communication information"). The received communication information includes private information serving as predetermined information. Examples of the private information include information with which the source of a communication can be identified, such as (i) the phone number of a caller, (ii) the name of an email sender, or (iii) the email address of an email sender. Another example of the private information is information indicating content of a received communication, such as the subject of an email. Note that the private information can include various types of information associated with the basic information in the storage section 60.

In a case where the status determining section 41 determines that the information device 1 is not being left unattended, the output control section 42 outputs received communication information via the display section 32 and/or the sound output section 50. Conversely, in a case where status determining section 41 determines that the mobile device is being left unattended, the output control section 42 skips output of the received communication information.

The following description will discuss a case where the storage section 60 stores a database in which (i) the information that can be included in the basic information is associated with (ii) the additional information. This database is shown in Table 1 below. Note that an asterisk appearing in the "private information" column indicates that the relevant item is private information. Under these conditions, in a case where the phone number "090-xxx-xxxx" is included in the basic information, an image file "file://yamada.jpg", which has been registered as "image (face)", is treated as private information. As such, the image file "file://yamada.jpg" will not be displayed (outputted). Conversely, the sound data "preinstalled 1", which has been registered as "ringtone", is not treated as private information. In such an instance, the output control section 42 can play back the sound data "preinstalled 1" and output it via the sound output section 50.

TABLE 1

| # | Item | Registered Information | Private Information |
|---|------|------------------------|---------------------|
| 1 | Phone Number | 090-xxxx-xxxx | |
| 2 | Email Address | yamada@examplie.com | * |
| 3 | Name | Taro Yamada | * |
| 4 | Group | Friends | |
| 5 | Image (Face) | file://yamada.jpg | * |
| 6 | Image (Full Body) | file://yamada2.jpg | * |
| 7 | Nickname | Yamada | * |
| 8 | Ringtone | Preinstalled 1 | |
| 9 | Vibration Pattern | Pattern A | |
| 10 | LED Pattern | LED Pattern A | |

[2. Processing Related to Receiving Communication]

The following description will discuss, with reference to FIG. 2, processing in the information device 1 which processing relates to receiving a communication. FIG. 2 is a flowchart showing processing in Embodiment 1 which processing relates to receiving a communication.

The communication section 10 first determines whether or not a predetermined communication, such as an email or phone call, has been received (S1). In a case where the predetermined communication has not been received (S1, "NO"), the communication section 10 repeats step S1.

Upon receipt of the predetermined communication (S1, "YES"), the communication section 10 supplies the basic information to the status determining section 41. Upon receipt of the basic information from the communication section 10, the status determining section 41 determines whether or not the information device 1 is being left unattended, in response to the sensor 20 (S2). The status determining section 41 then supplies, to the output control section 42, a determined result, along with the basic information.

In a case where the information device 1 is being left unattended (S2, "YES"), processing ends instead of the output control section 42 outputting received communication information. Conversely, in a case where the information device 1 is not being left unattended, (S2, "NO"), the output control section 42 outputs the received communication information (S3). Note that, in the above processing, the output control section 42 can (i) obtain, from the storage section 60, additional information associated with the basic information and then (ii) include the additional information with the received communication information.

With the above processing, in a case where the information device 1 is being left unattended when a communication is received, the information device 1 skips outputting of received communication information relating to the received communication. Conversely, in a case where the information device 1 is not being left unattended, i.e., in a case where the information device 1 is being used, the information device 1 outputs the received communication information relating to the received communication. This configuration makes it possible to prevent a person other than the user from being aware of private information contained in the received communication information, in a case where the information device 1 is being left unattended (i.e., in a case where a person other than the user can easily acquire information outputted by the information device via glancing, etc.). In a case where the information device is being used, the above configuration also makes it possible for the user to immediately be aware of private information relating to a received communication.

[Variation]

In Embodiment 1, the status determining section 41 can alternatively determine whether or not the information device 1 is being left unattended (S5 of FIG. 4), based on, for example: a status of the display section 32; other information detected by the sensor 20; or input received by the input section 31. The status determining section 41 can determine that the information device 1 is not being left unattended, based on, for example, the fact that (i) the display section 32 is in a displaying state, (ii) the sensor 20 has detected acceleration of the information device 1 having not exceeded a predetermined threshold for a predetermined amount of time or longer, or (iii) the input section 31 has received no input for a predetermined amount of time or longer.

Note that the status determining section 41 can alternatively use a combination of criteria for determining whether or not the information device 1 is being left unattended. For example, the status determining section 41 can be configured to determine that (i) the information device 1 is not being left unattended, based on a combination of (a) a detection of the information device 1 being held and (b) a detection of the display section 32 being in a displaying state and (ii) otherwise the information device 1 is being left unattended.

Embodiment 2

Figure 3:
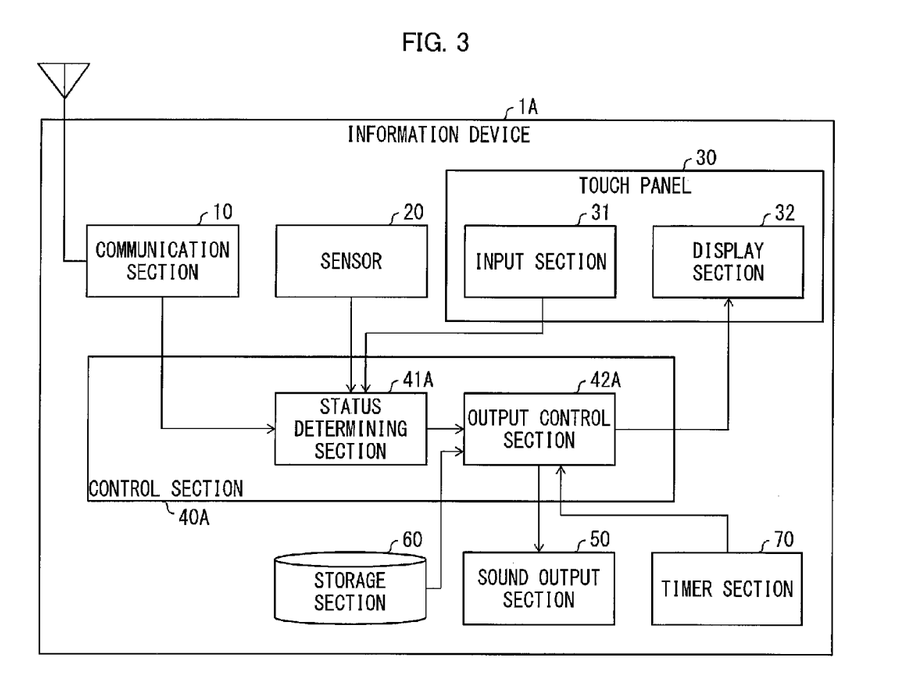
FIG. 3 is a functional block diagram illustrating a configuration of an information device in accordance with Embodiment 2 of the present invention.
Figure 4:
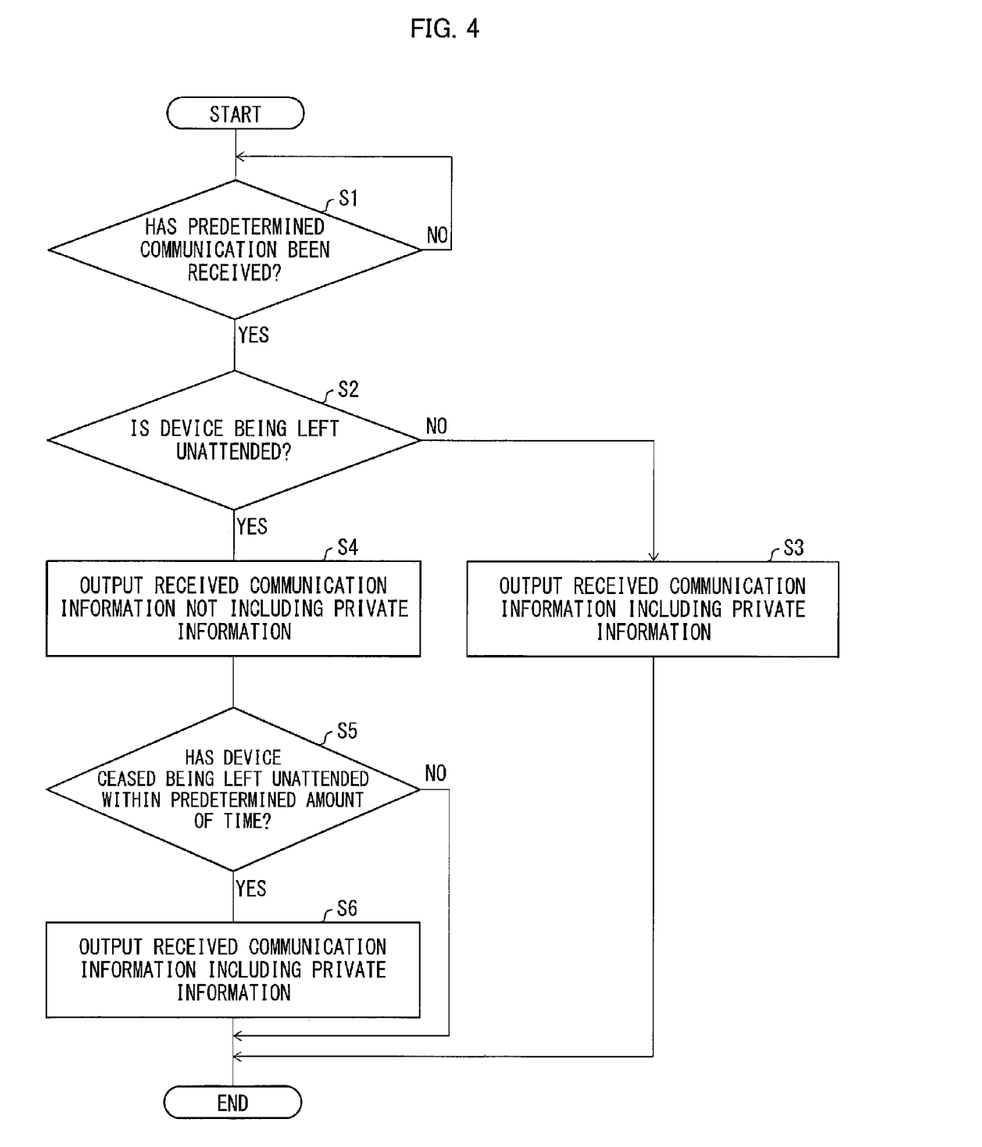
FIG. 4 is a flowchart showing processing in Embodiment of the present invention which processing relates to receiving a communication.

The following description will discuss Embodiment 2 of the present invention with reference to FIGS. 3 and 4. Note that, for convenience, members and processing having functions identical to those described in Embodiment 1 are given respective identical reference numbers, and a description of such members and processing is omitted in Embodiment 2.

First, differences between (i) an information device 1A according to Embodiment 2 and (ii) the information device 1 according to Embodiment 1 are described as follows, with reference to FIG. 3. FIG. 3 is a functional block diagram illustrating a configuration of the information device 1A according to Embodiment 2. The information device 1A differs from the information device 1 in that the information device 1A includes a control section 40A instead of the control section 40 and further includes a timer section 70. The control section 40A differs from the control section 40 in that the control section 40A includes a status determining section 41A and an output control section 42A, instead of the status determining section 41 and the output control section 42, respectively.

The status determining section 41A differs from the status determining section 41 in that the status determining section 41A determines whether or not the information device 1A is being left unattended based on a request from the output control section 42A.

The output control section 42A differs from the output control section 42 in that (i) the output control section 42A displays received communication information not including private information in a case where the device is being left unattended and (ii) the output control section 42A displays proper received communication information, including private information, in a case where the information device 1A ceases being left unattended within a predetermined amount of time after receipt of the predetermined communication. In order to display received information not including private information, the output control section 42 acts as follows. Specifically, in a case where the status determining section 41A determines that the information device 1 is being left unattended, the output control section 42 generates received communication information in which private information is removed from a combination of basic information and associated additional information. The output control section 42 then outputs the received communication information thus generated via a display section 32 and/or a sound output section 50. However, in a case where the status determining section 41A determines that the mobile device is not being left unattended, the output control section 42 outputs, via the display section 32 and/or the sound output section 50, received communication information that (i) is composed of basic information and associated additional information and (ii) includes private information.

The timer section 70 provides notification of passage of time, in response to a query from the output control section 42A. In Embodiment 2, the output control section 42A uses the notification of passage of time in order to confirm whether or not a predetermined amount of time has passed since a predetermined communication has been received.

Next, the following discussion will describe, with reference to FIG. 4, differences between Embodiments 1 and 2 with regards to processing relating to receiving a communication. FIG. 4 is a flowchart showing processing in Embodiment 2, which processing relates to receiving a communication.

In Embodiment 2, in a case where a predetermined communication is received (S1, "YES") and the device is being left unattended (S2, "YES"), the output control section 42A outputs, via the display section 32 or the sound output section 50, received communication information not including private information relating to the received communication (S4). Output of the received communication information, not including private information relating to the received communication, can be realized in the form of, for example, sound output from the sound output section 50 or blinking of the display section 32. With this configuration, even in a case where the information device 1A is being left unattended, it becomes possible to let the user be aware that a predetermined communication has been received, without a person other than the user being aware of private information.

Subsequent to step S4, the output control section 42A determines whether or not the information device 1A has ceased being left unattended within a predetermined amount of time after receiving a predetermined communication (S5). In a case where the information device 1A remains unattended during the predetermined amount of time after receiving the predetermined communication (S5, "NO"), the process ends. Conversely, in a case where the information device 1A ceases being left unattended within the predetermined amount of time after receiving the predetermined communication (S5, "YES"), the output control section 42A outputs normal received communication information including private information relating to the received communication (S6). With the proceeding, normal received communication information containing private information is outputted in a case where the information device 1A ceases to be left unattended, i.e., in a case where (i) the information device 1A is available to the user and (ii) there is a decreased likelihood that a person other than the user will acquire information outputted by the information device 1A. This makes it possible to enhance the convenience for the user without increasing the risk of private information being acquired by a person other than the user.

Embodiment 3

A control block (especially the control sections 40 and 40A) of each of the information devices 1 and 1A can be realized by a logic circuit (hardware) provided in an integrated circuit (IC chip) or the like or can be alternatively realized by software as executed by a central processing unit (CPU).

In the latter case, the information devices 1 and 1A each include a CPU that executes instructions of a program that is software realizing the foregoing functions; a read only memory (ROM) or a storage device (each referred to as "storage medium") in which the program and various kinds of data are stored so as to be readable by a computer (or a CPU); and a random access memory (RAM) in which the program is loaded. An object of the present invention can be achieved by a computer (or a CPU) reading and executing the program stored in the storage medium. Examples of the storage medium encompass "a non-transitory tangible medium" such as a tape, a disk, a card, a semiconductor memory, and a programmable logic circuit. The program can be supplied to the computer via any transmission medium (such as a communication network or a broadcast wave) which allows the program to be transmitted. Note that the present invention can also be achieved in the form of a computer data signal in which the program is embodied via electronic transmission and which is embedded in a carrier wave.

[Overview]

A mobile device (information device 1) according to a first aspect of the present invention includes: a status determining section (status determining section 41, 41A) for determining, in a case where a communication is received, whether or not the mobile device is being left unattended; and an output control section (output control section 42, 42A) for outputting predetermined received communication information relating to a received communication in a case where the status determining section has determined that the mobile device is not being left unattended, the output control section skipping output of the predetermined received communication information in a case where the status determining section has determined that the mobile device is being left unattended.

With the above configuration, in a case where the mobile device is being left unattended when a communication is received, the mobile device skips outputting of received communication information relating to the received communication. Conversely, in a case where the mobile device is not being left unattended, i.e., in a case where the mobile device is being used or carried, the mobile device outputs the received communication information relating to the received communication. This makes it possible to prevent a person other than the user from being aware of the predetermined received communication information relating to the received communication information, in a case where the mobile device is being left unattended, i.e., in a case where a person other than the user can easily acquire information outputted by the mobile device. In a case where the mobile device is being used, the above configuration also makes it possible for the user to immediately be aware of predetermined information relating to a received communication. That is, the above configuration makes it possible to prevent a person other than the user from being aware of predetermined received communication information relating to a received communication, while also enabling the user to immediately be aware of the predetermined received communication information relating to a received communication.

In a second aspect of the present invention, the mobile device of the first aspect can be arranged such that in a case where the status determining section has determined that the mobile device is being left unattended, the output control section provides notification that the communication has been received.

With the above configuration, even in a case where the mobile device is being left unattended, the mobile device provides notification that a communication device has received a communication. This makes it possible for the user to be aware that the mobile device has received a communication even in a case where the mobile device is being left unattended.

In a third aspect of the present invention, the mobile device of the first or second aspects can be arranged such that in a case of detection of the mobile device being held, the status determining section determines that the mobile device is not being left unattended.

With the above configuration, predetermined received communication information is outputted in a case where the mobile device is being held. This enables the user to immediately be aware of the predetermined received communication information in a case where the user is holding the mobile device when a communication is received.

In a fourth aspect of the present invention, the mobile device of any of the first through third aspects can be arranged such that in a case where a display section of the mobile device is in a displaying state, the status determining section determines that the mobile device is not being left unattended.

With the above configuration, received communication information is outputted in a case where a display section of the mobile device is in a displaying state. Generally, the display section of the mobile device is in a displaying state in a case where the mobile device is being used. In light of this fact, the above configuration makes it possible for the user to immediately be aware of predetermined received communication information in a case where the user is using the mobile device when a communication is received.

In a fifth aspect of the present invention, the mobile device of any of the first through fourth aspects can be arranged such that in a case where an acceleration of the mobile device is greater than or equal to a predetermined threshold, the status determining section determines that the mobile device is not being left unattended.

With the above configuration, received communication information is displayed in a case where an acceleration of the mobile device is greater than or equal to a predetermined threshold. This makes possible for the user to immediately be aware of received communication information in a case where, for example, the user is carrying the mobile device when a communication is received.

Furthermore, the status determining section can be configured such that it continues to determine that the mobile device is being left unattended until a predetermined amount of time passes after the acceleration of the mobile device ceases being greater than or equal to the threshold. In general, once a certain amount of time has passed after the acceleration of a mobile device ceases being greater than or equal to a predetermined threshold (for example, once a certain amount of time passes after the mobile device is placed on a desk), the mobile device will no longer be monitored by the user. Therefore, with the above configuration, the predetermined received communication information is (i) outputted in a case where the mobile device is being monitored by the user, and (ii) not outputted in a case where the mobile device is no longer being monitored.

In a sixth aspect of the present invention, the mobile device of any of the first through fifth aspects can be arranged such that in a case where an input section of the mobile device is accepting input from a user, the status determining section determines that the mobile device is not being left unattended.

With the above configuration, it is possible for the user to immediately be aware of received communication information in a case where the user is operating the mobile device when a communication is received.

In a seventh aspect of the present invention, the mobile device of any of the first through sixth aspects can be arranged such that the predetermined received communication information outputted by the output control section includes information with which a source of the received communication can be identified.

With the above configuration, information with which the source of a communication can be identified is (i) not outputted in a case where the mobile device is being left unattended, and (ii) outputted in a case where the mobile device is not being left unattended. This makes is possible to prevent a person other than the user from being aware of the source of a communication, while also enabling the user to immediately be aware of the source of a communication.

In an eighth aspect of the present invention, the mobile device of any of the first through seventh aspects can be arranged such that the predetermined received communication information outputted by the output control section includes information indicating content of the received communication.

With the above configuration, it is possible to prevent a person other than the user from being aware of content of the received communication while also enabling the user to immediately be aware of content of the received communication.

The mobile device according to the foregoing embodiments of the present invention may be realized by a computer. In such a case, the present invention encompasses: a control program for the mobile device which program causes a computer to operate as the foregoing means of the mobile device so that the mobile device can be realized by the computer; and a computer-readable storage medium storing the control program therein.

The present invention is not limited to the embodiments, but can be altered by a skilled person in the art within the scope of the claims. An embodiment derived from a proper combination of technical means each disclosed in a different embodiment is also encompassed in the technical scope of the present invention. Further, it is possible to form a new technical feature by combining the technical means disclosed in the respective embodiments.

INDUSTRIAL APPLICABILITY

The present invention is applicable to a communication-capable and portable smartphone, mobile phone, personal digital assistant (PDA), and personal computer (PC).

REFERENCE SIGNS LIST

1, 1A Information device (mobile device)
41, 41A Status determining section (status determining section)
42, 42A Output control section (output control section)

The invention claimed is:
1. A mobile device comprising:
circuitry and an associated memory; and
a sensor that outputs a signal indicating whether or not the mobile device is being held; wherein
the circuitry determines, in a case where a communication is received, whether or not the mobile device is being left unattended;
the circuitry outputs predetermined received communication information relating to a received communication in a case where the circuitry has determined that the mobile device is not being left unattended, the circuitry skipping output of the predetermined received communication information in a case where the circuitry has determined that the mobile device is being left unattended; and
in a case where the signal indicates that the mobile device is being held, the circuitry determines that the mobile device is not being left unattended.

2. The mobile device as set forth in claim 1, wherein in a case where the circuitry has determined that the mobile device is being left unattended, the circuitry provides notification that the communication has been received.

3. The mobile device as set forth in claim 1, wherein in a case where a display of the mobile device is in a displaying state, the circuitry determines that the mobile device is not being left unattended.

4. The mobile device as set forth in claim 1, wherein in a case where an acceleration of the mobile device is greater than or equal to a predetermined threshold, the circuitry determines that the mobile device is not being left unattended.

5. The mobile device as set forth in claim 1, wherein in a case where an input of the mobile device is accepting input from a user, the circuitry determines that the mobile device is not being left unattended.

6. The mobile device as set forth in claim 1, wherein the predetermined received communication information outputted by the circuitry includes information with which a source of the received communication can be identified.

7. The mobile device as set forth in claim 1, wherein the predetermined received communication information outputted by the circuitry includes information indicating content of the received communication.

\* \* \* \* \*